UNITED STATES PATENT OFFICE.

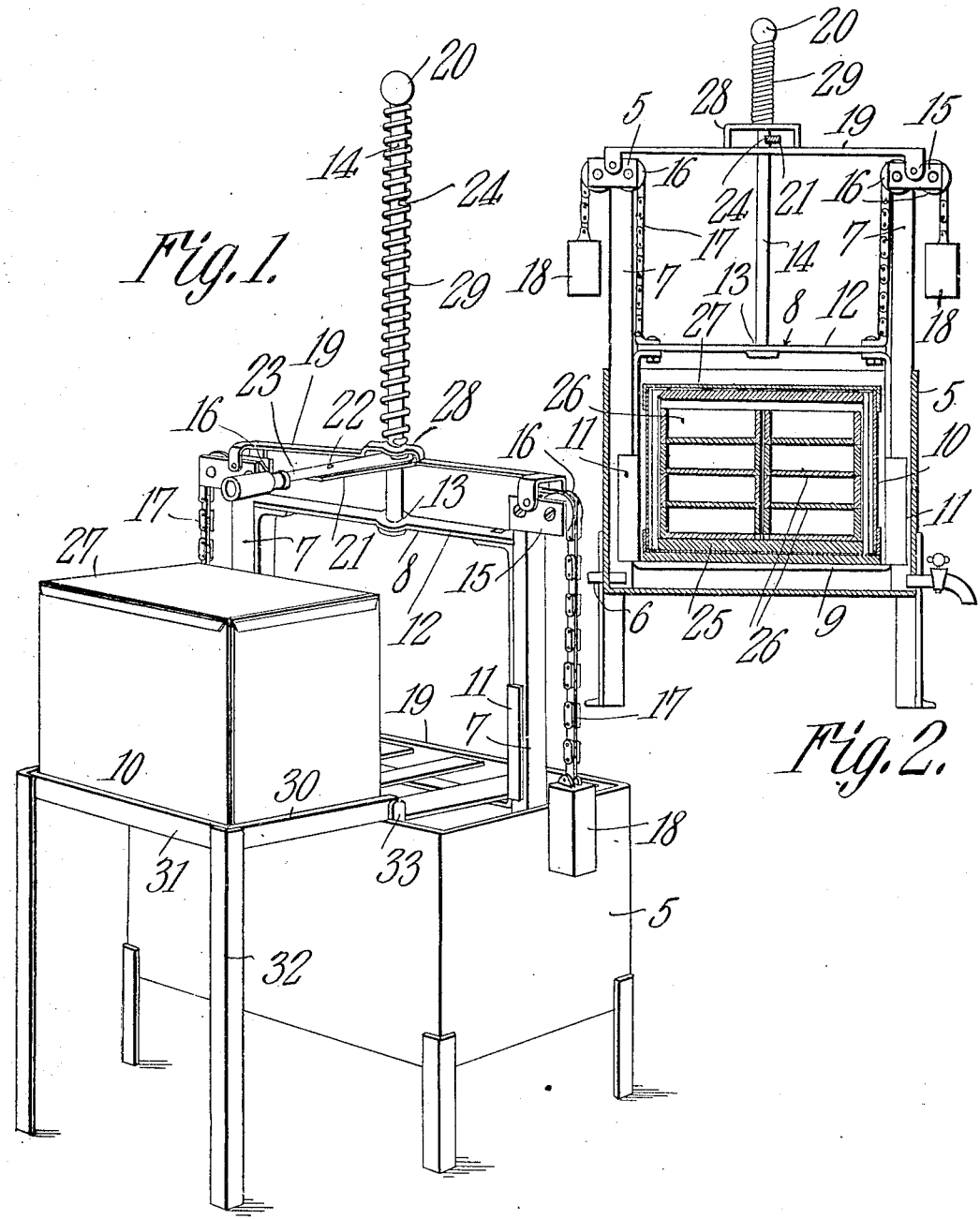

ARTHUR T. BRADSHAW, OF PHILADELPHIA, PENNSYLVANIA.

COOKING APPARATUS.

No. 875,889.  Specification of Letters Patent.  Patented Jan. 7, 1908.

Application filed June 19, 1906. Serial No. 322,439.

*To all whom it may concern:*

Be it known that I, ARTHUR T. BRADSHAW, a citizen of the United States, residing at Philadelphia, in the county of Philadelphia and State of Pennsylvania, have invented a new and useful Cooking Apparatus, of which the following is a specification.

This invention relates to cooking apparatus.

The object of the invention is to provide a receptacle adapted to contain a quantity of heated liquid and having a food receptacle associated therewith and movable to operative position within the liquid for cooking the food.

A further object is to provide means for locking the food receptacle in operative position and means for automatically elevating said receptacle when the locking means is released.

A further object is to provide a supporting table adapted to receive the food-receptacle when the latter is moved to inoperative position, said receptacle being provided with a plurality of removable trays containing the different articles of food to be cooked.

A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a perspective view of a cooking apparatus constructed in accordance with my invention. Fig. 2 is a longitudinal sectional view of the same showing the approved receptacle submerged.

Similar numerals of reference indicate corresponding parts in all of the figures of the drawings.

The cooking apparatus consists of a tank or heating receptacle 5 adapted to contain a quantity of water or other liquid for cooking the food, said liquid being heated in any suitable manner as by a steam-pipe 6 passing through one of the walls of the tank and communicating with the interior thereof as shown.

Secured to the walls of the tank are spaced uprights 7 which form guides for a vertically movable carrier 8. The carrier 8 consists of a substantially rectangular frame to which is secured a platform 9 adapted to receive an air tight food-containing receptacle 10. The side bars of the carrier are provided with lateral guide flanges 11 which embrace the standard 7 as shown and connecting the upper ends of the side bars of the frame is a transversely disposed bar 12 provided with a central perforation 13 for the reception of a rod 14.

Secured to the free ends of the uprights 7 are brackets 15 having sprocket wheels 16 journaled therein for engagement with sprocket chains 17 one end of which is attached to the bar 12 while the opposite end thereof is provided with a suitable counter-weight 18. The brackets 15 are connected by a bar 19 the opposite ends of which are preferably bifurcated as shown to permit the free passage of the sprocket-chains 17 and formed in the bar 19 is an opening preferably arranged in alinement with the opening 13 and through which passes the rod 14. One end of the rod 14 is rigidly secured to the bar 12 while the opposite end thereof terminates in a finger-piece or knob 20 by means of which the carrier may be moved to operative position within the heating tank.

The bar 19 is provided with a laterally extending arm 21 on which is pivotally mounted at 22 a locking lever 23 the free end of which engages a recess or notch 24 formed in the free end of the rod 14 when the carrier is lowered to operative position thereby locking said carrier in operative position.

Arranged within the food-containing receptacle 10 is a rack 25 adapted to receive a plurality of trays 26 for containing the eggs, meat or other articles of food to be cooked, said receptacle being provided with an air-tight closure 27 so as to prevent the entrance of water when the receptacle is submerged.

Mounted on the rod 14 and interposed between the knob 20 and the reinforcing bracket 28 is a coil spring 29 which assists in returning the carrier to elevated or inoperative position when the locking lever 23 is released.

Extending laterally from the heating receptacle or tank 5 is a supporting table 30 adapted to receive the food-receptacle 10 when the latter is elevated or moved to inoperative position, said table being provided with a marginal flange 31 and having angle bars 32 secured to the corners of the flanges and constituting supporting legs for the table as shown. The platform 9 is provided with upwardly extending lugs 33 which serve to center the receptacle 10 and prevent accidental displacement of same during the cooking operation.

The carrier 8 is so arranged that when the same is moved to elevated or inoperative position the platform 9 will be disposed in horizontal alinement with the supporting table 30 so that the tank 10 containing the cooking food may be moved laterally on the supporting table and another tank containing uncooked food placed on the platform and in position to be submerged in the liquid thus permitting the device to be continuously operated. If desired a second recess may be formed in the rod 14 at a point adjacent the fixed end thereof so that by moving the lever 23 in engagement with said notch or recess the carrier may be locked in elevated position.

The operation of the device is as follows: An egg, or sufficient quantity of ham or other meat to make a sandwich is placed within each of the trays 26 and the latter positioned within the food-receptacle 10 after which the latter is placed on the platform 9 and the carrier lowered within the liquid by depressing the knob 20 and moving the locking lever 23 laterally until the active end thereof enters the recesses 24. When the food has been thoroughly cooked the lever is removed to released position when the coil spring together with the weights 18 will elevate the carrier until the platform 9 registers with the supporting table 30 and in which position the food receptacle 10 may be readily transferred to said table. The cover of the receptacle 10 is then detached and the trays containing the cooked food removed from said receptacle and placed in a suitable warming oven or compartment until ready for consumption.

If desired the weights 18 for operating the carrier of the cooking receptacle may be dispensed with and a plurality of rods each carrying a coil-spring used in lieu of said weights for elevating the carrier to inoperative position.

From the foregoing description it is thought that the construction and operation of the device may be readily understood by those skilled in the art and further description thereof is deemed unnecessary.

Having thus described the invention what is claimed is:

1. A device of the class described comprising a liquid containing receptacle, spaced standards secured to the receptacle and connected by a transverse bar having an opening formed therein, a carrier arranged within the receptacle and provided with a rod extending through the opening in the transverse bar, laterally extending guide flanges secured to the carrier and engaging the standards, a food receptacle supported by the carrier and movable to operative position within the liquid, a locking member pivotally mounted on the transverse bar and adapted to engage the rod for locking the food receptacle in operative position, and a spring interposed between one end of the rod and the transverse bar for automatically elevating the food receptacle when the locking means is released.

2. A device of the class described comprising a liquid containing receptacle, spaced standards secured to the opposite sides of the receptacle and provided with sprocket-wheels, a transverse bar connecting the free ends of the standards a carrier arranged within the receptacle, sprocket-chains disposed beneath the bar and each having one end thereof secured to the carrier and its opposite end passing over the sprocket-wheels and provided with a weight, a food receptacle supported by the carrier and movable to operative position within the liquid, a notched rod secured to the carriage and extending through the transverse bar, means engaging the notch in the rod for locking the receptacle in operative position, a spring for elevating the carrier when the locking means is released, and a table disposed in alinement with the upper edge of the liquid containing receptacle and adapted to receive the food receptacle when the carrier is in elevated position.

3. A device of the class described comprising a liquid containing receptacle, standards secured to the receptacle and provided with sprocket-wheels, guide flanges forming a part of the carrier and engaging said standards, sprocket-chains passing over the sprocket wheels each having one end thereof secured to the carrier and the opposite end thereof provided with a weight, a transverse bar connecting the standards and provided with a laterally extended arm, a rod secured to the carrier and passing through said bar and provided with a locking notch, a locking lever pivotally mounted on the lateral arm and adapted to engage the notch in the rod for locking the carrier in operative position, and a spring carried by the rod for automatically elevating the carrier when the locking lever is released.

4. A device of the class described comprising a liquid containing receptacle, a carrier arranged within the receptacle and provided with a platform having vertically disposed lugs disposed on opposite sides thereof, an air tight food receptacle supported by the platform and engaging said lugs, a plurality of trays arranged within the receptacle, a rod secured to the carrier for moving the food-receptacle to operative position within the liquid, means for locking the food receptacle in operative position, a spring carried by the rod for elevating the receptacle when the locking means is released, and intake and discharge passages communicating with the interior of the liquid receptacle.

In testimony that I claim the foregoing as my own, I have hereto affixed my signature in the presence of two witnesses.

ARTHUR T. BRADSHAW.

Witnesses:
 HARRY M. COOPER,
 L. F. BEISHLINE.